United States Patent
Kojima et al.

(10) Patent No.: US 11,079,550 B2
(45) Date of Patent: Aug. 3, 2021

(54) GRATING COUPLER AND INTEGRATED GRATING COUPLER SYSTEM

(71) Applicants: Mitsubishi Electric Research Laboratories, Inc., Cambridge, MA (US); Mitsubishi Electric Corporation, Tokyo (JP)

(72) Inventors: Keisuke Kojima, Weston, MA (US); Satoshi Nishikawa, Tokyo (JP); Shusaku Hayashi, Tokyo (JP); Yosuke Suzuki, Tokyo (JP); Jonathan Klamkin, Santa Barbara, CA (US); Yingheng Tang, West Lafayette, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/774,897

(22) Filed: Jan. 28, 2020

(65) Prior Publication Data
US 2021/0116645 A1    Apr. 22, 2021

Related U.S. Application Data

(60) Provisional application No. 62/924,287, filed on Oct. 22, 2019.

(51) Int. Cl.
*G02B 6/34* (2006.01)
*G02B 6/124* (2006.01)

(52) U.S. Cl.
CPC ............ *G02B 6/34* (2013.01); *G02B 6/124* (2013.01)

(58) Field of Classification Search
CPC  G02B 6/12019; G02B 6/12004; G02B 6/124; G02B 6/29323; G02B 6/34; H01S 5/142; H01S 5/187
See application file for complete search history.

(56) References Cited

U.S. PATENT DOCUMENTS 10,921,525 B2 *    2/2021  Kojima  .............. G02B 6/12019

\* cited by examiner

*Primary Examiner* — Michael P Mooney
(74) *Attorney, Agent, or Firm* — Gene Vinokur; Hironori Tsukamoto

(57) ABSTRACT

A grating coupler having first and second ends for coupling a light beam to a waveguide of a chip includes a substrate configured to receive the light beam from the first end and transmit the light beam through the second end, the substrate having a first refractive index n1, a grating structure having curved grating lines arranged on the substrate, the grating structure having a second refractive index n1, wherein the curved grating lines have line width w and height d and are arranged by a pitch Λ, wherein the second refractive index n2 is less than first refractive index n1, and a cladding layer configured to cover the grating structure, wherein the cladding layer has a third refractive index n3. The curves of the grating lines are constructed such that the emitting beam is shaped for efficient coupling to another optical component. The curves can also be tilted to reduce coupling back into the waveguide.

17 Claims, 7 Drawing Sheets

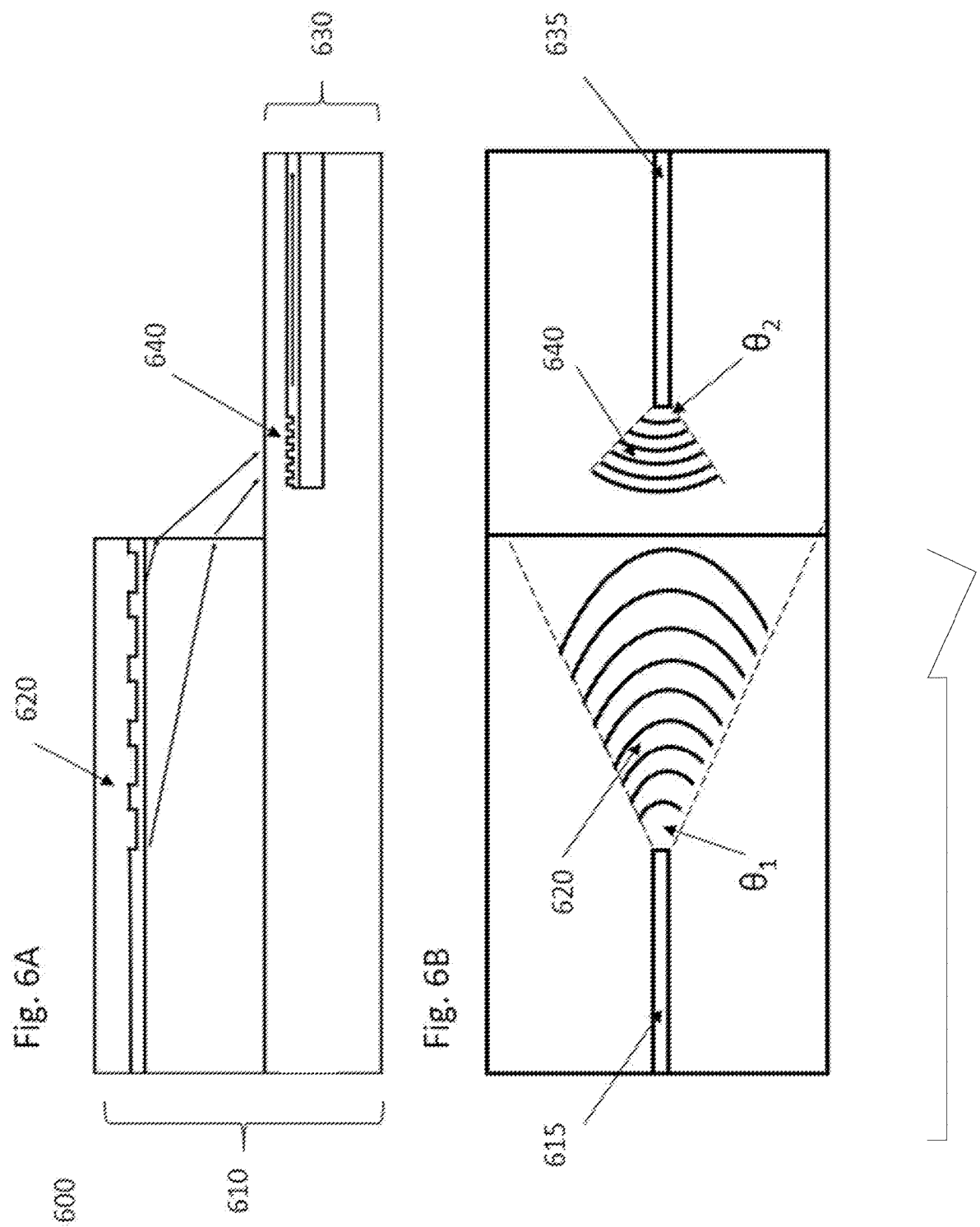

GRATING COUPLER AND INTEGRATED GRATING COUPLER SYSTEM

CROSS-REFERENCE TO RELATED APPLICATION

This application claims priority benefit of U.S. Provisional Patent Application Ser. No. 62/924,287, filed on Oct. 22, 2019, the contents of which are incorporated herein by reference in their entireties and the benefits of each are fully claimed.

FIELD OF THE INVENTION

This invention generally relates to grating couplers for optical chips, also called photonic integrated circuits (PICs), and more particularly to grating coupler system connecting one active chip and one passive optical chip.

BACKGROUND OF THE INVENTION

The target application is a hybrid integration of an active optical chip such as one containing InP waveguides and a passive chip such as one containing silicon and/or silicon nitride waveguides. The expected properties are, large tolerance to mis-alignment, easiness of bonding processes, and high coupling efficiency.

Silicon photonics offer many advantages of which the fabrication cost is the most important factor. Furthermore, high refractive index contrast between the silicon waveguide and the surrounding silicon dioxide layers offer tight bending with low loss possible, leading to higher density and complexity PICs. Silicon nitride waveguides offer similar low cost capabilities, with lower optical loss property. On the other hand, there is no reliable optical gain or emission capability with direct current injection. Therefore, hybrid integration of active PICs (such as InP, GaAs, or GaN-based ones) with passive silicon photonics PICs become very important to achieve low cost, full functionality, and high density PICs.

However, optically connecting two waveguides precise requires precise alignment typically with sub-micron accuracy, due to narrow waveguides and thus fast diverging beam on both sides. There is a need to connect two optical chips with larger tolerance with high coupling efficiency.

SUMMARY OF THE INVENTION

Some embodiments of the present disclosure are based on recognition that two-dimensional long period grating on a passive waveguide from an optical chip creates shallow angle emission towards the substrate side, diffracted at the chip facet (second end) at a steeper angle, manipulated to form a narrow beam, and then coupled to the passive optical chip through a grating coupler.

In accordance to some embodiments, a novel grating coupler system is realized by a grating coupler having first and second ends for coupling a light beam to a waveguide of a chip including a substrate configured to receive the light beam from the first end and transmit the light beam through the second end, the substrate having a first refractive index $n1$; a grating structure having grating curves (lines) arranged on the substrate, the grating structure having a second refractive index $n2$, wherein the grating curves (lines) have line width w and height d and are arranged by a pitch $\Lambda$, wherein the second refractive index $n2$ is greater than first refractive index $n1$; and a cladding layer configured to cover the grating structure, wherein the cladding layer has a third refractive index $n3$, wherein the third refractive index $n3$ is different from the second refractive index $n2$, wherein the cladding layer is arranged so as to reflect the light beam diffracted from the grating structure toward below the cladding layer. The two-dimensional grating curves (lines) comprise a series of arcs which are part of ellipse lines, whose pitch is gradually decreased in two dimensions, such that the diffracted beam is shaped or narrowed to have a focused spot on the second grating, which is typically a silicon grating.

In accordance with another embodiment of the present invention, a grating coupler having first and second ends for coupling a light beam to a waveguide of a chip includes a substrate configured to receive the light beam from the first end and transmit the light beam through the second end, the substrate having a first refractive index $n1$; a grating structure having grating curves arranged on the substrate, the grating structure having a second refractive index $n2$, wherein the grating curves have line width w and height d and are arranged by a pitch $\Lambda$, wherein the second refractive index $n2$ is greater than the first refractive index $n1$, wherein the grating curves are arranged to diffract the light beam to form a narrowing beam in a two orthogonal axes perpendicular to a light propagation direction of the light beam; and a cladding layer configured to cover the grating structure, wherein the cladding layer has a third refractive index $n3$, wherein the third refractive index $n3$ is different from the second refractive index $n2$.

Further, another embodiment of the present invention is based on recognition that an integrated grating coupler system includes a grating coupler formed on a first chip, the grating coupler having first and second ends for coupling a light beam to a waveguide of a second chip, wherein the grating coupler comprises a substrate configured to receive the light beam from the first end and transmit the light beam through the second end, the substrate having a first refractive index $n1$; a grating structure constructed to have grating curves arranged on the substrate, the grating structure having a second refractive index $n2$, wherein the grating curves have line width w and height d and are arranged by a pitch $\Lambda$, wherein the second refractive index $n2$ is greater than first refractive index $n1$; and a cladding layer configured to cover the grating structure, wherein the cladding layer has a third refractive index $n3$, wherein the third refractive index $n3$ is less than the second refractive index $n2$. The cladding layer can be of the same material as the substrate, or $SiO_2$, $Si_3N_4$, or polymer.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6A show a cross-section view of an example structure a grating coupler including a first chip (light beam transmission side) and a second chip (receiving the transmitted beam from the first chip), according to embodiments of the present invention; and FIG. 6B shows the top view of the grating coupler system of FIG. 6A, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Furthermore, embodiments of the subject matter disclosed may be implemented, by use of at least in part, or combinations of parts of the structures described below.

Optical coupling between two optical chips constitute the most important part of hybrid PICs. The easiness of alignment and high coupling efficiency are very important factors. Grating couplers offer these capabilities. In some cases, conventional elliptic grating curves create a collimating beam, i.e., beam shape is almost constant along the propagation axis. However, this is not sufficient when the emission area is large and narrower beam width, or focusing, is necessary to couple into the second grating efficiently. According to embodiments of the present invention, it provides shapings of grating curves, such that the beam is formed to be of a desired shape at the surface of the second grating, resulting in higher coupling efficiency.

There are multiple factors in achieving high coupling efficiency for this configuration.

Figure 1:
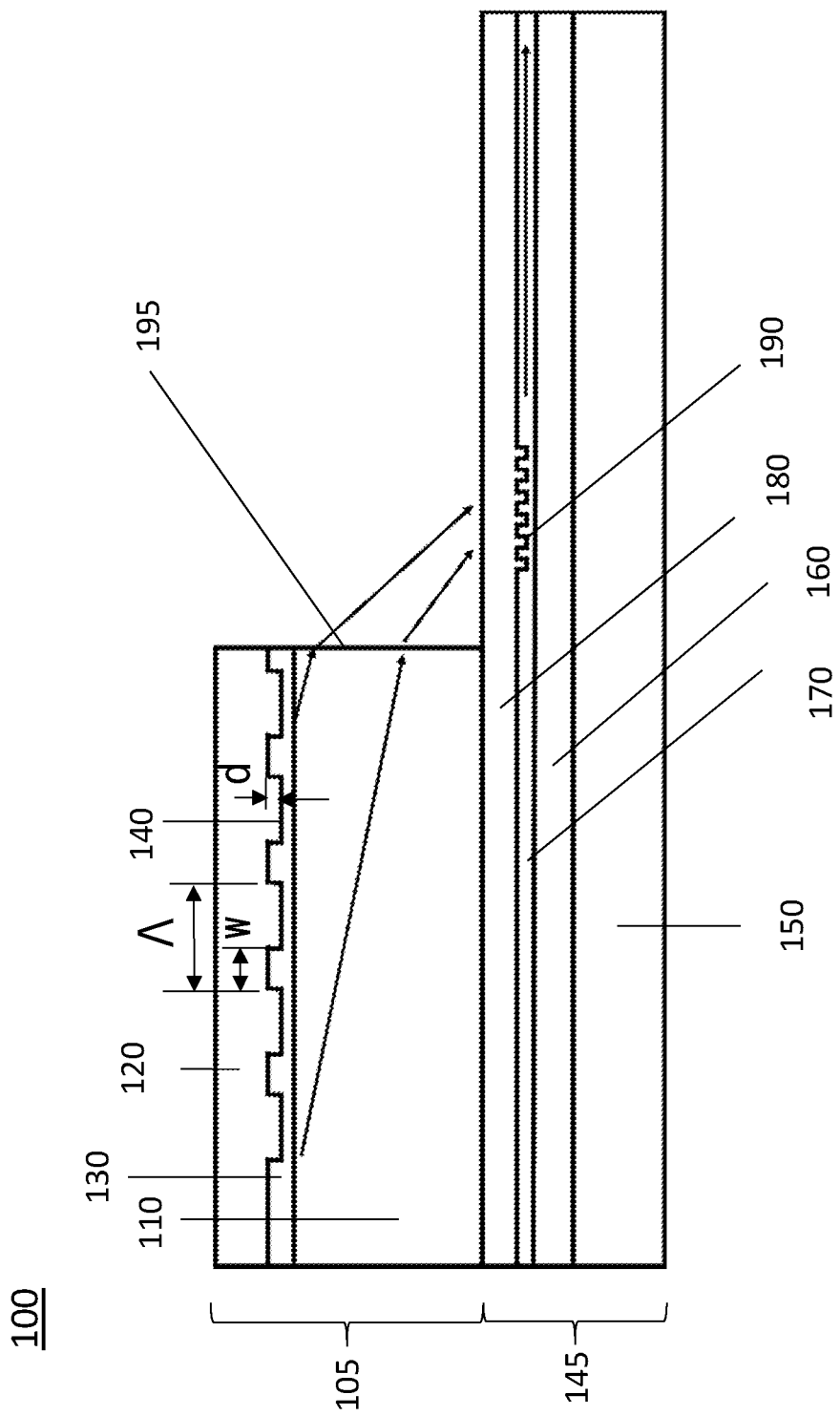
FIG. 1 shows a cross-sectional view of an integrated grating coupler system according to embodiments of the present invention.

FIG. 1 shows a cross-sectional view of an integrated grating coupler system 100 according to the invention. The first optical chip (first chip) 105 is made on an InP substrate 110, containing an InGaAsP waveguide layer 130, InP cladding layer 120, and a first grating 140. The second optical chip (second chip) 145 comprises of a silicon substrate 150, a buried $SiO_2$ layer (also called a BOX layer) 160, a silicon (Si) waveguide layer (also called silicon-on-insulator, or SOI) 170, and a $SiO_2$ cladding layer 180, and the second grating 190 etched onto the silicon waveguide layer. The diffracted light in the first optical chip 105 propagates through the InP substrate 110 and the first optical chip facet 195, and is coupled into the grating 190 on the second optical chip 145. Further, an example of a top view of an integrated grating coupler system is shown in FIGS. 6A and 6B.

Here, the grating pitch Λ is the distance between the rising edges of the grating, w is the line width of the main tooth, and d is the thickness of the grating. The grating pitch Λ does not have to be constant, and can be a function of the propagation distance from the end of the input waveguide, expressing a chirped grating. The grating pitch Λ also depends on the angle from the primary propagation distance, to form elliptic lines. In the first optical chip, grating diffracts light towards the substrate as a shallow angle, which is further diffracted at the chip fact to a steeper angle. The beam is shaped and is shone on the grating in the second chip and is guided to its waveguide. The operating wavelength of 1530-1570 nm, the typical grating pitch Λ is 5-15 μm, and the typical grating line width w is 10-60% of the grating pitch, depending on whether sub-gratings are included, or how the sub-gratings are designed. The typical grating thickness d is 0.2-1 μm.

Figure 2A:
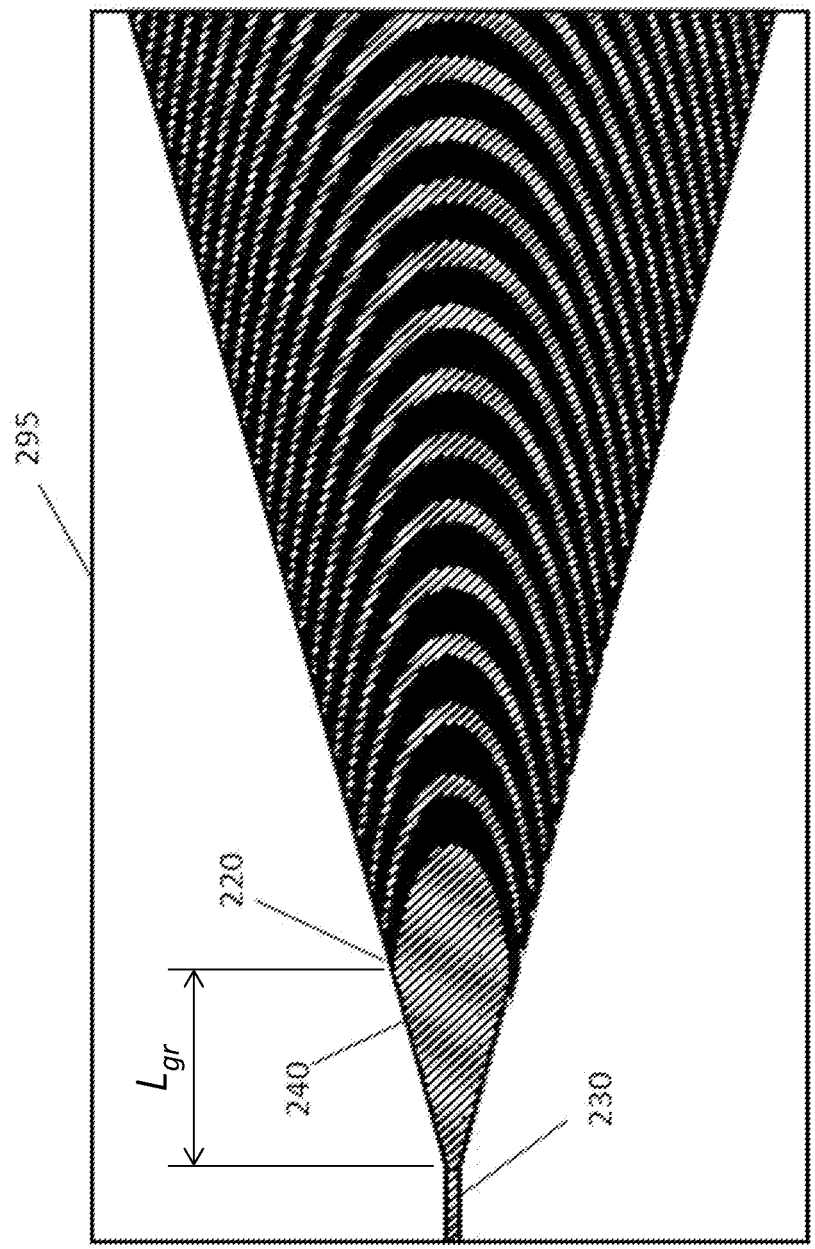
FIG. 2A shows the top view of the two-dimensional grating curves which includes the thickness of each grating line, according to embodiments of the present invention.

FIG. 2A shows an example illustrating a top view of a grating structure 295, wherein the shaded region 240 is the area whose cladding layer thickness is greater than the surrounding area, 220 is the etched grating regions, and 230 is the input waveguide.

It should be noted that a distance $L_{gr}$ between a straight end of the first end to a first grating line is arranged so that substantial amount of the intensity of the light beam can reach to the first grating curve (line) without unwanted diffractions of the light beam. For instance, the distance $L_{gr}$ may be a range of $n\lambda_g$ (n: a multiplier; $\lambda_g$: wavelength of the light beam in the waveguide), where the multiplier n may be between 10 to 1000, more preferably, 50-500.

Figure 2B:
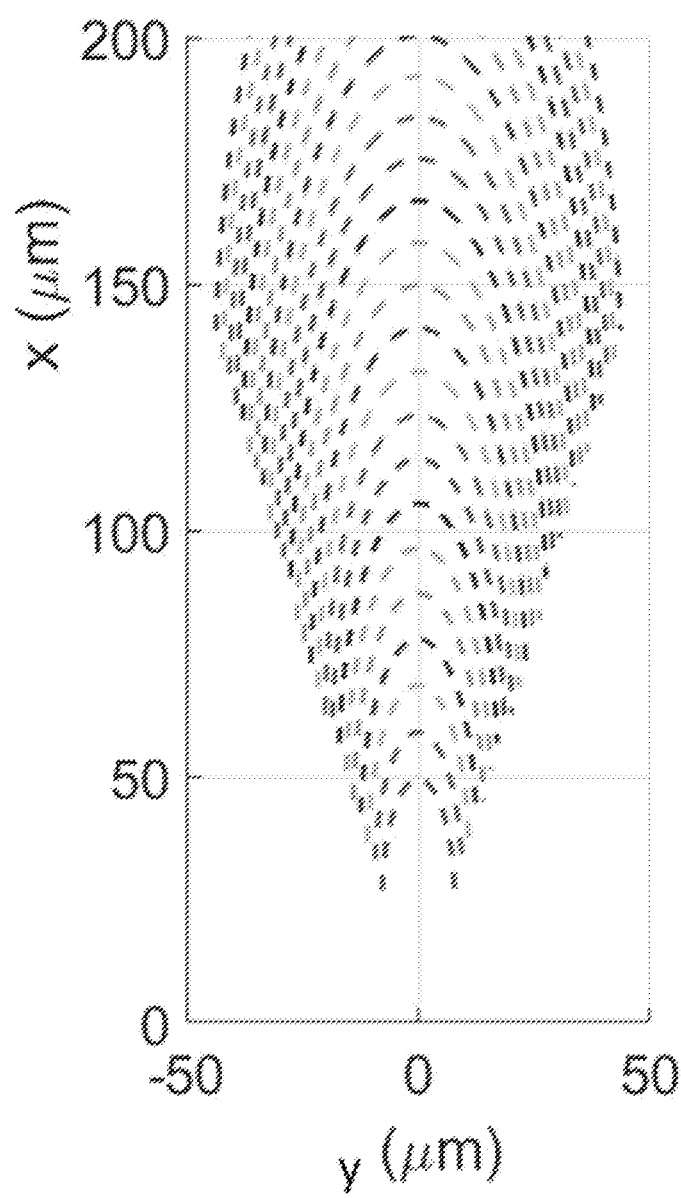
FIG. 2B shows the top view of center lines of the two-dimensional grating curves to embodiments of the present invention.

FIG. 2B shows a top view of center lines of the grating curves of the etched regions 220, wherein the grating curves are expressed as $$q\lambda = xn_c \cos \phi_c - n_{eff}(x^2 + y^2)^{\frac{1}{2}} + \Delta_x x^2 + \Delta_y y^2 \tag{1}$$

where x and y are the directions parallel to and perpendicular to the light propagation in the grating structure, respectively, q=m, m+1, m+2 . . . (m>0) is the integer corresponding to each grating line, λ is the wavelength, $n_c$ is the refractive index of the substrate, $\phi_c$ is the angle from the waveguide surface normal, $n_{eff}$ is the effective refractive index of the waveguide, $\Delta_x$ and $\Delta_y$ are the coefficients of grating chirp, expressing the narrowing or focusing effect in x and y direction. Negative values of $\Delta_x$ and $\Delta_y$ mean that the pitch or spacing of the curves decrease as the curves move away from the origin (0, 0), i.e., the end of the input waveguide. Note that Eq. (1) does not necessarily express ellipse lines unless both $\Delta_x$ and $\Delta_y$ are zero, however, they can be very well approximated by ellipse lines. The actual grating curves are part of the Eq. (1), such that they form protrusions toward a light propagation direction of the light beam as shown in FIG. 2A.

The diffracted light from this grating can be manipulated in two dimensions, i.e., in the two orthogonal axes each perpendicular to the diffracted beam propagation direction. With a proper choice of the negative values for $\Delta_x$ and $\Delta_y$, the diffracted beam can be narrowed as it propagates. In the case where $\Delta_x$ or $\Delta_y$ is equal to zero, i.e., the distance between the grating curves stays constant, the diffracted beam stays collimated in the corresponding direction.

Also, when they the absolute values of $\Delta_x$ and $\Delta_y$ are small, then grating curves expressed by Eq. (1) have distances decreasing at a fixed rate. This value may be determined, typically between 0.2% and 2% of the pitch, so as to have enough narrowing effect (to form a narrowing beam within the area of the grating 640, see FIGS. 6A and 6B) but not to have too close focusing distance.

An integrated grating coupler system may contain semiconductor lasers on the same substrate, however, semiconductor lasers are very sensitive to any reflection. It may cause mode hopping or laser linewidth fluctuation. Therefore, it is very important to minimize any reflection from the optical components inside or outside of the cavity, including grating couplers which tend to show small amount of back reflection.

Figure 3:
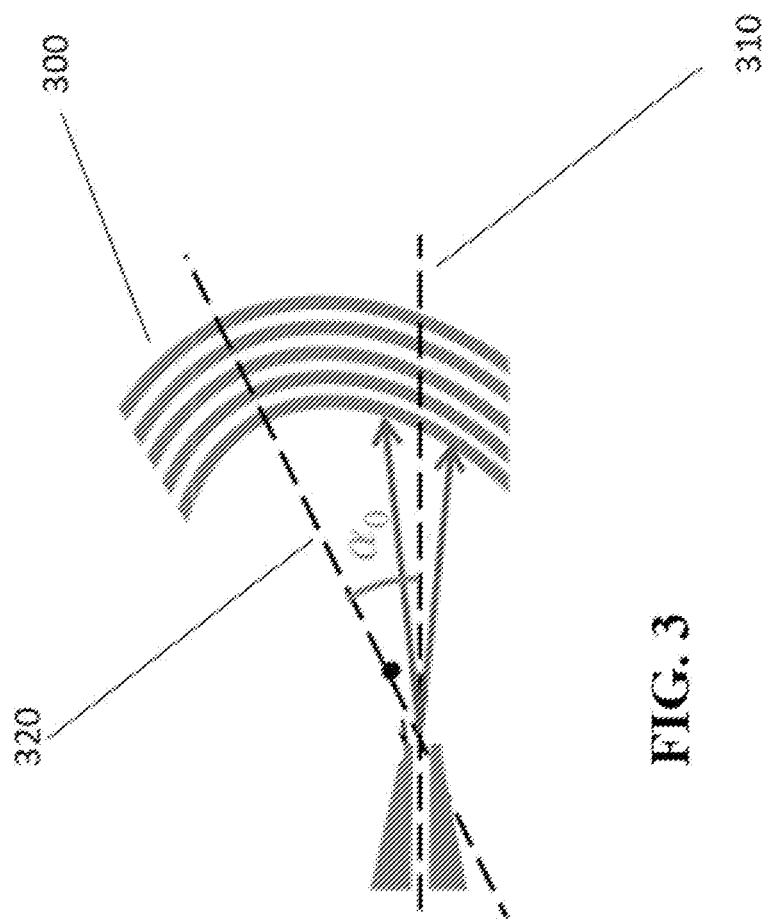
FIG. 3 shows a two-dimensional grating structure, where the grating is arranged to be asymmetric with respect to the light propagation direction of the light beam such that the reflected light from the grating curves is prevented from coupling to the first end of the waveguide, according to embodiments of the present invention.

FIG. 3 shows a schematic of a two-dimensional grating, where the two-dimensional grating is asymmetric with respect to the light propagation direction of the light beam 310. In this case, the two-dimensional grating is arranged so that the reflected light from the gratings curves is prevented from coupling to the first end of the waveguide. In other words, the axes 320 of the curves 300 (long axes in the case of nearly ellipse curves) cross the waveguide line 310 with non-zero angle $\alpha_0$.

The cladding layer can be a non-semiconductor material. Contrary to using semiconductor cladding layer which usually requires costly crystal regrowth, dielectric ($SiO_2$ or $Si_3N_4$) or polymer materials do not require regrowth, so the fabrication is easier and cost is lower.

However, the refractive index of dielectric or polymer materials are typically between 1.4 and 2.3, while that of the waveguide layer is between 3.0 and 3.6 at the wavelength of 1.3-1.6 µm where most optical communications take place. Therefore, the refractive index difference between the waveguide layer and the cladding layer becomes larger than when a semiconductor is used in the cladding layer. This creates a situation where higher-order (n=2, 3, 4, 5 . . . ) diffraction players a larger role, and reduces the coupling efficiency to another grating coupler (or another optical component), typically made on Si substrate. Therefore, it is very important to minimize the higher-order diffraction.

Each order of diffraction is highly correlated to the Fourier component of the diffraction grating. For example, rectangular diffraction grating contains large amount of third-order and fifth-order Fourier component, so the third- and fifth order diffraction is very high. Therefore, it is important to effectively soften the rising and falling edge of the grating.

Figure 4:
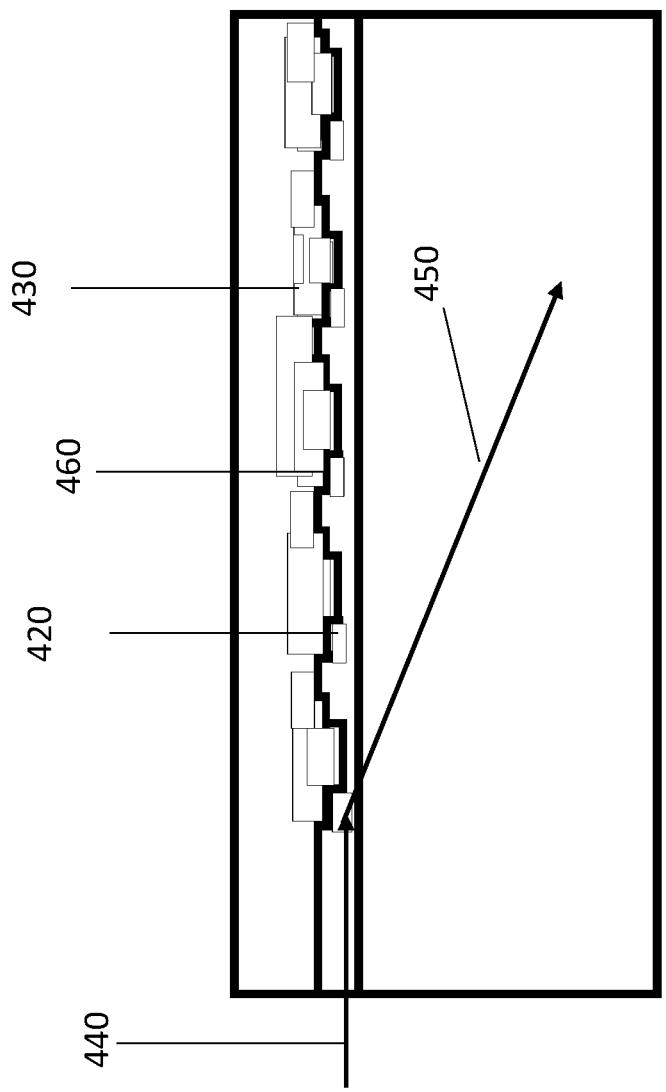
FIG. 4 shows a side view of the multi-step grating structure, according to embodiments of the present invention.

FIG. 4 shows the side view of the gratings, wherein the waveguide layer 420, sandwiched by a substrate 410 and a cladding layer 430, is formed by a grating 460 with more than two height levels or steps. This can be formed by multiple photolithography and etching processes. Since the typical grating pitch for InP grating couplers is 8-12 µm, the formation of the multiple-step grating is feasible even with processes capable the minimum feature size of −0.5 µm.

Figure 5:
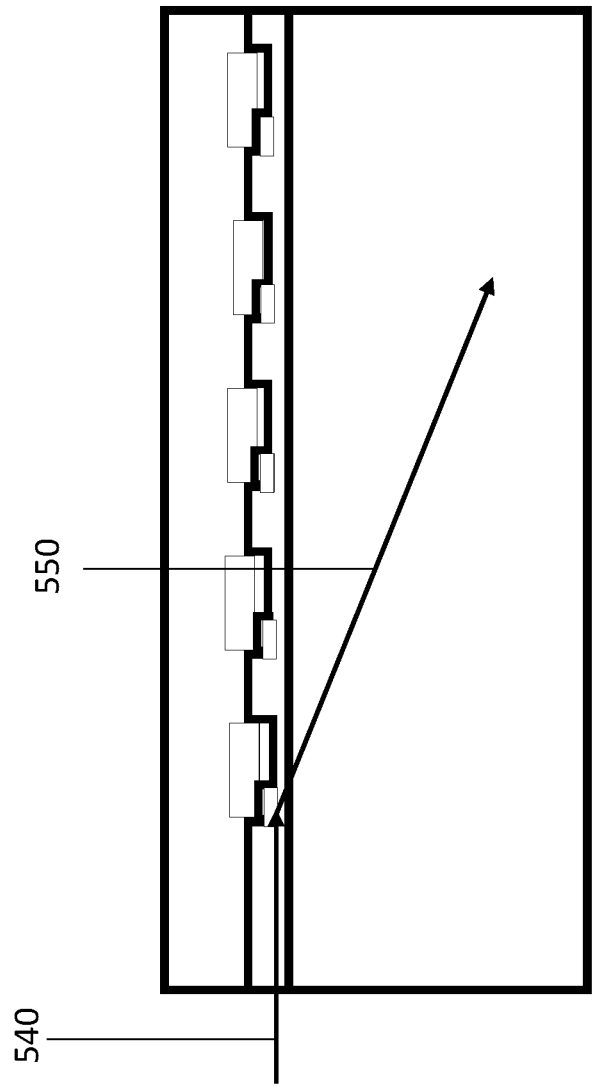
FIG. 5 shows a side view of the gratings wherein the asymmetric gratings are formed by multiple steps, according to embodiments of the present invention.

In addition, the cross-sectional shape of the grating can be asymmetric as shown in FIG. 5. With respect to the direction of the light propagation 540, the grating can have a sharper sizing etch and slower falling edge, which creates an effective blazing grating effect. This way, the input light is more effectively directed to the downward direction 550.

FIG. 6A show a cross-section view of an example structure a grating coupler including a first chip (light beam transmission side) and a second chip (receiving the transmitted beam from the first chip). As described above the grating lines are arranged according to Equation (1) with respect to FIGS. 2A and 2B, having predetermined distances and curvatures. FIG. 6B shows the top view of the grating coupler system of FIG. 6A, where the grating lines are curved. $\theta_1$ and $\theta_2$ are the angles for the concentric grating lines for the first and second chips, respectively. One way to narrow the lateral beam divergence is to use curved gratings, such as elliptic grating. FIGS. 6A and 6B show a cross-sectional view and a top of the grating coupler system 600, respectively, wherein the first optical chip 610 and second optical chip 630 have elliptical gratings 620 and 640, respectively. In one example, an InP waveguide 615 with around 1 µm width is connected to the elliptic grating 620 with at least 10° in full width. A silicon waveguide 635 with 0.5 µm width is also connected to an elliptic silicon grating 640.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A grating coupler having first and second ends for coupling a light beam to a waveguide of a chip comprising:

a substrate configured to receive the light beam from the first end and transmit the light beam through the second end, the substrate having a first refractive index n1;

a grating structure having grating curves arranged on the substrate, the grating structure having a second refractive index n2, wherein the grating curves have line width w and height d and are arranged by a pitch Λ, wherein the second refractive index n2 is greater than the first refractive index n1, wherein the grating curves are arranged to diffract the light beam to form a narrowing beam in a two orthogonal axes perpendicular to a light propagation direction of the light beam; and a cladding layer configured to cover the grating structure, wherein the cladding layer has a third refractive index n3, wherein the third refractive index n3 is different from the second refractive index n2.

2. The grating coupler of claim 1, wherein curves of the grating curves are constructed such that the diffracted beam is shaped for coupling to another grating coupler.

3. The grating coupler of claim 1, wherein curves of the grating curves are constructed such that the diffracted beam is focused on another grating coupler.

4. The grating coupler of claim 1, wherein the grating curves are arranged as partial elliptic lines such that the partial elliptic lines form curves having protrusions toward a light propagation direction of the light beam, wherein the spacing between the lines are narrowed as a function of a distance from the end of a waveguide.

5. The grating coupler of claim 1, wherein the center of the grating curves are expressed as $$q\lambda = xn_c \cos \phi_c - n_{eff}(x^2 + y^2)^{\frac{1}{2}} + \Delta_x x^2 + \Delta_y y^2$$

where x and y are directions parallel to and perpendicular to the light propagation, respectively, wherein q=m, m+1, m+2 . . . (m>0) is an integer corresponding to each grating line from the first end, λ is a wavelength of the light beam, $n_c$ is a refractive index of the substrate, $\phi_c$ is an angle from the waveguide surface normal, $n_{eff}$ is an effective refractive index of the waveguide, $\Delta_x$ and $\Delta_y$ are coefficients of grating chirp.

6. The grating coupler of claim 1, wherein the grating curves are arranged in an asymmetric manner with respect to a light propagation direction of the light beam, such that the reflected light from the grating curves is prevented from coupling to the first end of the waveguide.

7. The grating coupler of claim 1, wherein the cladding layer comprises silicon dioxide.

8. The grating coupler of claim 1, wherein the cladding layer comprises silicon nitride.

9. The grating coupler of claim 1, wherein the cladding layer comprises polymer.

10. The grating coupler of claim 1, wherein the cladding layer comprises the same material as the substrate.

11. The grating coupler of claim 1, wherein the grating comprises more than two height levels.

12. The grating coupler of claim 1, wherein a cross-sectional shape of the grating is asymmetric.

13. The grating coupler of claim 11, wherein a rising edge of the grating is shaper than a falling edge of the grating.

14. The grating coupler of claim 1, wherein the grating curves are arranged to be concave shapes against an input beam coining from a beam input.

15. The grating coupler of claim 1, wherein distances between the grating curves are non-uniform.

16. The grating coupler of claim 15, wherein the distances are arranged to decrease at a fixed rate.

17. The grating coupler of claim 1, wherein the distance between a straight end of the first end to a first grating line is a multiple of the wavelength of the light beam in the waveguide, wherein the multiplier is between 50 and 500.

* * * * *